United States Patent [19]
O'Leary, Jr.

[11] Patent Number: 5,281,004
[45] Date of Patent: Jan. 25, 1994

[54] MODIFIED MINI STOCK RACING CAR WHEEL HUB

[76] Inventor: Raymond O'Leary, Jr., 1625 Dale Ave., East Meadow, N.Y. 11554

[21] Appl. No.: 881,175

[22] Filed: May 11, 1992

[51] Int. Cl.⁵ ............................................. B60B 27/00
[52] U.S. Cl. ................................... 301/105.1; 301/126
[58] Field of Search ............. 301/105.1, 108.1, 108.4, 301/111, 124.1, 126, 131, 125

[56] References Cited

U.S. PATENT DOCUMENTS

| | | | |
|---|---|---|---|
| 1,982,377 | 11/1934 | Duby | 301/126 |
| 2,087,684 | 7/1937 | Alessi-Grimaldi | 301/126 X |
| 2,334,673 | 11/1943 | Hawthorne | 301/105.1 X |
| 2,349,220 | 5/1944 | Eksergian | 301/105.1 |
| 2,539,387 | 1/1951 | Alden | 301/126 X |
| 3,967,857 | 7/1976 | Asberg | 301/125 |

FOREIGN PATENT DOCUMENTS

563163   9/1958   Canada ............. 301/105.1

*Primary Examiner*—Russell D. Stormer
*Attorney, Agent, or Firm*—Daniel Jay Tick

[57] ABSTRACT

Each of a number of wheel hubs of a modified mini stock racing car is removably affixed to a corresponding one of a number of brake rotors in coaxial relation with its corresponding axle. Each of the wheel hubs has a hollow cylindrical base portion coaxially positioned around the corresponding axle on the side of the corresponding brake rotor closer to the corresponding end of the corresponding axle than the opposite side of the brake rotor. The base portion has a first end and a spaced opposite second end axially farther from the corresponding brake rotor than the first end. A number of equiangularly spaced ears extend radially from the second end of the base portion of the hub for equal radial distances and a plurality of equiangularly spaced gussets equal in number to the ears extend radially from the base portion. Each of the gussets extends from a corresponding one of the ears along the base portion to the first end of the base portion and each of the gussets has a coupling component at its end adjacent the first end of the base portion to enable the rotor to be removably affixed to its corresponding wheel hub. Bearings are positioned between the axles and each of the wheel hubs and in contact with both the wheel hubs and the axles.

17 Claims, 5 Drawing Sheets

MODIFIED MINI STOCK RACING CAR WHEEL HUB

BACKGROUND OF THE INVENTION

The present invention relates to a modified mini stock racing car. This type of racing car is also known as a Pro Four Modified car, a Mini Modified car, a Mini Stock car, a Baby Grand car, a Daytona Dash, a Four Cylinder car, IMSA, GTU, SCCA, GT2, GT3 or GT4. More particularly, the invention relates to a wheel hub of a modified mini stock racing car.

In mini stock racing cars of the aforementioned types, the front and rear wheel hub designs are non-interchangeable, so that the four bearings of the rear wheels cannot be interchanged with the four bearings of the front wheels. The front bearings are two different sizes, so that the car requires three different sized bearings.

The wheel hub presently used has a close bolt pattern of four bolts in a circle having a diameter of approximately 4¼ inches. This increases the moment at the wheel attachment point and thus necessitates a heavy wheel rim center. In fact, a double center is required in most cases to strengthen the loaded area.

In present day cars of the type discussed, both the front and rear wheel hubs require an adapter plate to couple them to the brake rotor. This involves at least one part and a plurality of bolts at four locations.

The present wheel hub design does nothing to induce air circulation to assist brake cooling.

If a repair is to be made on a mini stock type racing car, said car must be jacked up and the rear wheel must be removed before the rear drive flange can be removed and serviced.

The principal object of the invention is to provide a modified mini stock racing car wheel hub which is efficient, effective and reliable in operation.

An object of the invention is to provide a modified mini stock racing car wheel hub of simple structure of great strength.

Another object of the invention is to provide a modified mini stock racing car wheel hub which is used with facility and convenience.

Still another object of the invention is to provide a modified mini stock racing car wheel hub which enables the use of a bearing of one size at all eight locations of the axles of the car.

Yet another object of the invention is to provide a modified mini stock racing car wheel hub which assists in brake cooling.

Still another object of the invention is to provide a modified mini stock racing car wheel hub which eliminates the need for an adapter plate in coupling to the brake rotor.

Yet another object of the invention is to provide a modified mini stock racing car wheel hub which may be interchangeably used on the front and rear axles.

Another object of the invention is to provide a modified mini stock racing car wheel hub which may be used with facility and convenience in Pro Four Modified cars, Mini Modified cars, Mini Stock cars, Baby Grand cars, Daytona Dashes, Four Cylinder cars, IMSAs, GTUs, SCCAs, GT2s, GT3s, GT4s and any cars having the same power and total weight.

Still another object of the invention is to provide a modified mini stock racing car wheel hub which adapts the 1948 to 1967 Volkswagon wide five wheel bolt pattern having an 8.071 inch diameter bolt center to the Baby Grand spindle upright and/or Baby Grand axle.

Yet another object of the invention is to provide a modified mini stock racing car wheel hub which is bolted to the brake rotor via five bolts at the five inch bolt center.

Another object of the invention is to provide a modified mini stock racing car wheel hub which is usable in both the front and rear assemblies; with the aid of a Baby Grand to Ford Pinto adapter when used in the front assembly or with the aid of a tubular body Baby Grand axle stub spindle upright and/or Baby Grand axle.

Still another object of the invention is to provide a modified mini stock racing car wheel hub which is a five bolt hub and replaces the presently used four bolt front hub.

Yet another object of the invention is to provide a modified mini stock racing car wheel hub.

Another object of the invention is to provide a modified mini stock racing car wheel hub which has a reduced moment at the axis or center of the wheel, thereby permitting the use of a lighter wheel center and an overall lighter wheel rim assembly.

Still another object of the invention is to provide a modified mini stock racing car wheel hub which produces reduced wheel bolt loading.

Yet another object of the invention is to provide a modified mini stock racing car wheel hub which produces a 58% reduction in wheel bolt loading compared to other wheel hubs.

Another object of the invention is to provide a modified mini stock racing car wheel hub which is driven in the rear axle assembly by a well known 8 bolt 24 spline drive flange.

Still another object of the invention is to provide a modified mini stock racing car wheel hub having reduced unsprung weight.

Yet another object of the invention is to provide a modified mini stock racing car wheel hub having reduced rotational mass.

BRIEF SUMMARY OF THE INVENTION

In accordance with the invention, in an automotive vehicle having a front axle having spaced opposite first and second ends, a rear axle having spaced opposite first and second ends, a plurality of brake rotors, each in proximity with a corresponding one of the ends of the axles in coaxial relation with its corresponding axle, each of a plurality of wheel hubs is removably affixed to a corresponding one of the brake rotors in coaxial relation with its corresponding axle. Each of the wheel hubs comprises a hollow substantially cylindrical base portion coaxially positional around the corresponding axle on the side of the corresponding brake rotor closer to the corresponding end of the corresponding axle than the opposite side of the brake rotor. The base portion has a first end and a spaced opposite second end axially from the corresponding brake rotor than the first end, a plurality of equiangularly spaced ears extending radially from the second end of the base portion of the hub for equal radial distances and a plurality of equiangularly spaced gussets equal in number to the ears extending radially from the base portion. Each of the gussets extend from a corresponding one of the ears along the base portion to the first end of the base portion and each of the gussets has coupling means at its end adjacent the first end of the base portion to enable the rotor to be removably affixed to its corresponding wheel hub. Bearing means are positioned between the axles and each of the wheel hubs and in contact with both the wheel hubs and the axles. A plurality of axle and locking means each at a corresponding end of each of the axles removably secures the wheel hubs and bearing means to their axes at their corresponding ends.

The base portion of each of the wheel hubs has five equiangularly spaced ears and five equiangularly spaced gussets.

The vehicle is a modified mini stock racing car.

Each of the gussets tapers down from its end at its corresponding ear to the first end of the base portion.

The locking means comprises a plurality of lock nuts and the vehicle further has dust caps, each at a corresponding end of one of the axles for capping the corresponding ends thereby covering the corresponding lock nuts.

In accordance with the invention, an automotive vehicle comprises a front axle having spaced opposite first and second ends, a rear drive axle having spaced opposite first and second ends and a plurality of brake rotors, each in proximity with a corresponding one of the ends of the axles in coaxial relation with its corresponding axle. Each of a plurality of brake rotors is removably affixed to a corresponding one of the wheel hubs in coaxial relation with its corresponding axle. Each of the wheel hubs has a hollow cylindrical base portion coaxially positioned around the corresponding axle on the side of the corresponding brake rotor closer to the corresponding end of the corresponding axle than the opposite side of the brake rotor. The base portion has a first end and a spaced opposite second end axially farther from the corresponding brake rotor than the first end, a plurality of equiangularly spaced ears extending radially from the spaced end of the base portion of the hub for equal radial distances and a plurality of equiangularly spaced gussets equal in number to the ears extending radially from the base portion, each of the gussets extending from a corresponding one of the ears along the base portion to the first end of the base portion. Each of the gussets has coupling means at its end adjacent the first end of the base portion to enable the brake rotor to be removably affixed to its corresponding wheel hub. Bearing means is positioned between the axles and each of the wheel hubs and in contact with both the wheel hubs and the axles. Each of a plurality of lock nuts is at a corresponding end of each of the axles for removably securing the wheel hubs to their axles at their corresponding ends.

The base portion of each of the wheel hubs has five equiangularly spaced ears and five equiangularly spaced gussets.

The vehicle is a modified mini stock racing car.

Each of the gussets tapers down from its end at its corresponding ear to the first end of the base portion.

Each of a plurality of dust caps is provided at a corresponding end of the axles for capping the corresponding end thereby covering the corresponding lock nut.

The rear axle is a drive axle and each of a pair of dust caps is provided at a corresponding end of the front axle for capping the ends of the front axle thereby covering the corresponding lock nut. Each of a pair of drive flanges is provided at a corresponding end of the rear axle for capping the ends of the rear axle thereby covering the corresponding lock nut.

Each of the drive flanges has 24 splines and accommodates eight bolts.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENT

Figure 5:
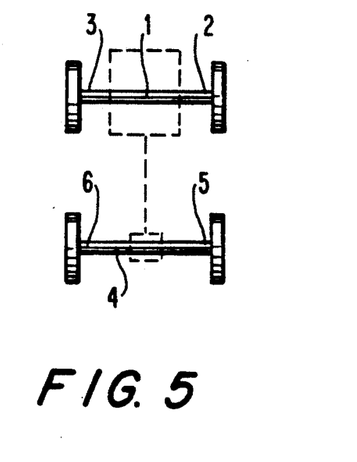
FIG. 5 is a schematic diagram of modified mini stock racing car axles and wheels.

The modified mini stock racing car, Pro Four Modified car, Mini Modified car, Mini Stock car, Baby Grand car, Daytona Dash, Four Cylinder car, IMSA, GTU, SCCA, GT2, GT3, GT4, and so on, of the invention has a front axle 1 having spaced opposite first and second ends 2 and 3, respectively (FIG. 5), and a rear axle 4 having spaced opposite first and second ends 5 and 6, respectively (FIG. 5).

Figure 1:
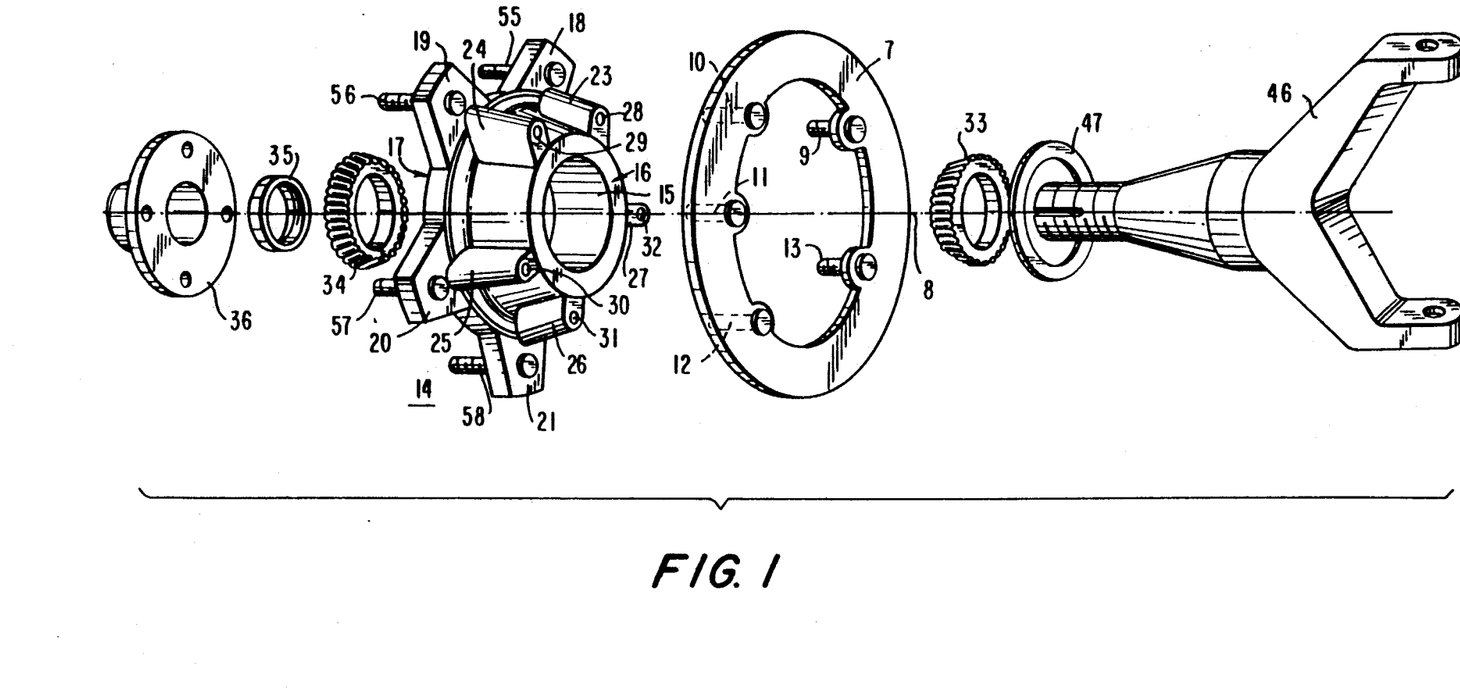
FIG. 1 is an exploded perspective view of an embodiment of the modified mini stock racing car wheel hub and its front axle assembly of the invention.
Figure 2:
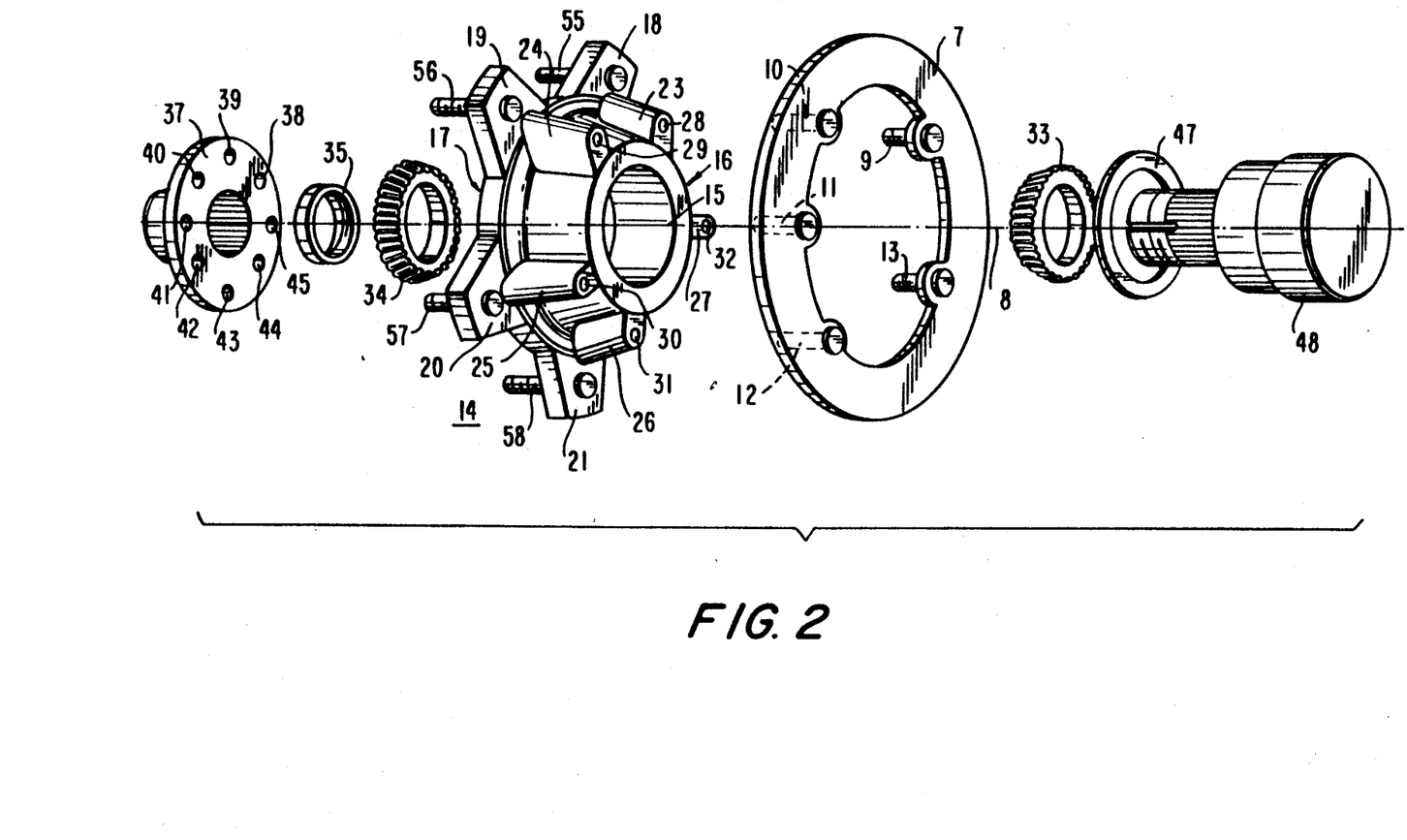
FIG. 2 is an exploded perspective view of the embodiment of FIG. 1 of the modified mini stock racing car wheel hub and a modification of its rear axle assembly of the invention.

A brake rotor 7 (FIGS. 1 and 2) is provided in proximity with each end 2, 3, 5 and 6 of the axles 1 and 4 in coaxial relation with its corresponding axle. Although there are four identical brake rotors 7, only the brake rotor in proximity with the second end 6 of the rear axle 4 is shown and described. In FIGS. 1 and 2, an axis 8 is the axis of each of the front and rear axles 2 and 4, respectively. The brake rotor 7 is a substantially plate-like ring having five equiangularly spaced bolts 9, 10, 11, 12 and 13 extending therefrom substantially parallel to the axis or center of said ring at the inner edge thereof.

A brake rotor 7 is removably affixed to the wheel hub 14, via the bolts, 9 to 13, in coaxial relation with the axle 4 (FIGS. 1 and 2). There are four identical wheel hubs 14, each having a corresponding one of the brake rotors 7 affixed thereto in coaxial relation with its corresponding axle, although only the wheel hub at the second end of the rear axle 4 is shown and described.

The wheel hub 14 has a hollow cylindrical base portion 15 (FIGS. 1 and 2) coaxially positioned around the corresponding axle, which in the illustration of FIGS. 1 and 2 is the axle 4, on the side of the corresponding brake rotor 7 closer to the corresponding end of said corresponding axle, which end, as shown in FIG. 5, is the end 6, than the opposite side of said brake rotor. The base portion 15 has a first end 16 and a spaced opposite second end 17 (FIGS. 1 and 2) axially farther from the corresponding brake rotor 7 than said first end.

Five equiangularly spaced ears 18, 19, 20, 21 and 22 extend radially from the second end 17 of the base portion 15 and are substantially in the plane of said second end, perpendicular to the axis 8 of the axle 4, as shown in FIGS. 1 and 2. The ears 18 to 22 extend for equal radial distances, as shown in FIGS. 1 and 2. The ear 22 is not seen in the view of FIGS. 1 and 2. Five equiangularly spaced gussets 23, 24, 25, 26 and 27 extend radially from the base portion 15 (FIGS. 1 and 2). Each of the gussets 23 to 27 extends from a corresponding one of the ears 18 to 22.

The gusset 23 extends from the ear 18 along the base portion 15 to the first end 16 of said base portion, as shown in FIGS. 1 and 2. The gusset 24 extends from the ear 19 along the base portion 15 to the first end 16 of said base portion (FIGS. 1 and 2). The gusset 25 extends from the ear 20 along the base portion 15 to the first end 16 of said base portion (FIGS. 1 and 2). The gusset 26 extends from the ear 21 along the base portion 15 to the first end 16 of said base portion (FIGS. 1 and 2). The gusset 27 (FIGS. 1 and 2) extends from the ear 22 (not seen in the FIGS.) along the base portion 15 to the first end 16 of said base portion.

The gussets 23 to 27 taper down from their ends at their corresponding ears 18 to 22, respectively, to the first end 16 of the base portion 15 (FIGS. 1 and 2). Each of the gussets 23 to 27 has a coupling component at its end adjacent the first end 16 of the base portion 15 to enable the brake rotor 7 to be removably affixed to the wheel hub 14. Thus, the gusset 23 has an internally threaded bore 28 at its end adjacent the first end 16 of the base portion 15 for accommodating the bolt 9 (FIGS. 1 AND 2). The gusset 24 has an internally threaded bore 29 at its end adjacent the first end 16 of the base portion 15 for accommodating the bolt 10 (FIGS. 1 and 2). The gusset 25 has an internally threaded bore 30 at this end adjacent the first end 16 of the base portion 15 for accommodating the bolt 11 (FIGS. 1 and 2). The gusset 26 has an internally threaded bore 31 at its end adjacent the first end 16 of the base portion 15 for accommodating the bolt 12 (FIGS. 1 and 2). The gusset 27 has an internally threaded bore 32 at its end adjacent the first end 16 of the base portion 15 for accommodating the bolt 13 (FIGS. 1 and 2).

Bearings 33 and 34 are positioned between the axles 1 and 4 and each of the four wheel hubs 14 in the usual manner, as shown in FIGS. 1 and 2, and in contact with the wheel hubs and the axles. The front and rear wheel hubs 14 are identical and interchangeable, so that the same size bearings are utilized in the racing car of the invention. The gusset 23 to 27 function as cooling fins which circulate air for the brakes and permit the brake rotor 7 to be bolted directly to the corresponding gussets at the first end 16 of the base portion 15 of the wheel hub 14. The configuration of the wheel hub 14 and rotor 7 permit fresh air to enter from one side and exhaust from the opposite side. In this forced air circulation, hot air inside the wheel produced by the brakes and cooler air, outside the wheel, produced by forward motion of the car result in the creation of a draft which is accelerated by the wheel hub 14. Furthermore, the wheel hub 14 of the invention has less unsprung weight and reduced rotational mass compared to presently used wheel hubs. Since the wheel hub 14 is a wide 5 wheel pattern, the moment arm at the center of the wheel is reduced, thereby permitting the center and rim assemblies of the wheel to be of less weight than known wheels; the reduction in wheel bolt loading being approximately 58%. the wheel hub 14 of the invention is a five bolt hub and replaces presently used four bolt hubs. The wheel hub 14 is interchangeable to any of the four locations in the car. However, the hub 14 may be modified, so that its dimensions are such that they accommodate the Ford Pinto OEM size.

Lock nuts are provided at the first and second ends 2 and 3 of the front axle 1 and at the first and second ends 5 and 6 of the rear axle 4 for securing the wheel hubs 14 to their axles at the corresponding ends of said axles. Thus, a lock nut 35 secures the wheel hub 14 to the rear axle 4 at the second end 6 of said rear axle, as shown in FIGS. 1 and 2.

A dust cap 36 (FIG. 1) is provided at each of the first and second ends 2 and 3 of the front axle assembly 1, for capping said ends of said front axle, thereby covering the corresponding lock nuts 35.

A pair of drive flanges 37 (FIG. 2) cap the ends 5 and 6 of the rear axle 4 thereby covering the lock nuts 35 on said ends of said rear axle. Each drive flange has 24 splines and accommodates 8 bolts. The drive flange 37 is driven by the axle when it is mounted on the rear axle. The drive flanges 37 drive the wheel hubs 14 on the rear axle assembly 4. Two rear drive flanges 37 are used in the usual manner in the modified mini stock racing car of the invention. In the event that a repair is required, there is no need to jack up the car or remove the wheel. The eight drive flange bolts need merely be removed so that the drive flange may be removed to permit the repair. The drive flange bolts are threadedly coupled to internally threaded tap holes (not shown in the FIGS.) bored in the second end 17 of the wheel hub 14.

Figure 6:
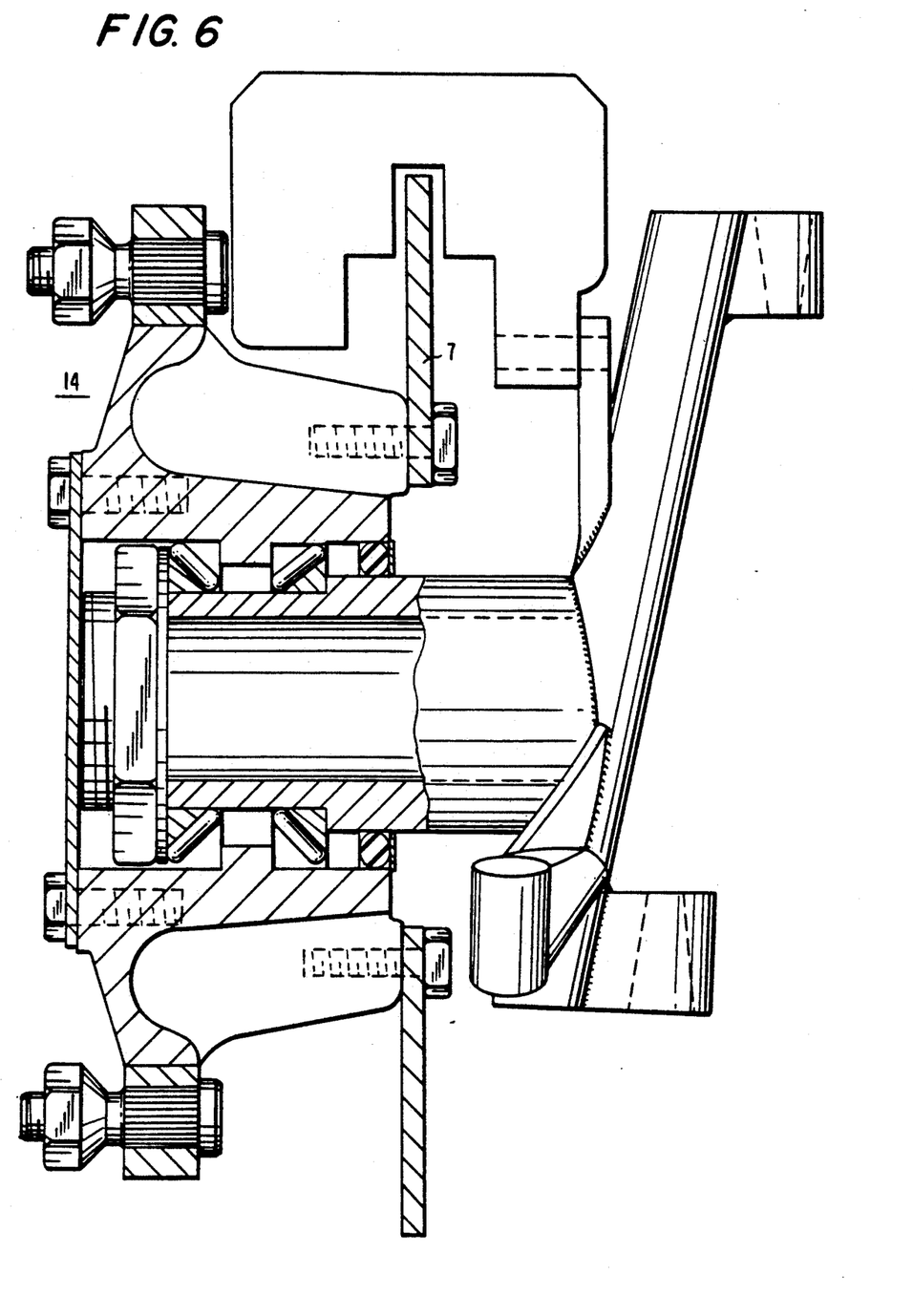
FIG. 6 is a cross-sectional view, on an enlarged scale, of a fully assembled hub assembly of the embodiment of FIG. 1, viewed from the front of the car.
Figure 7:
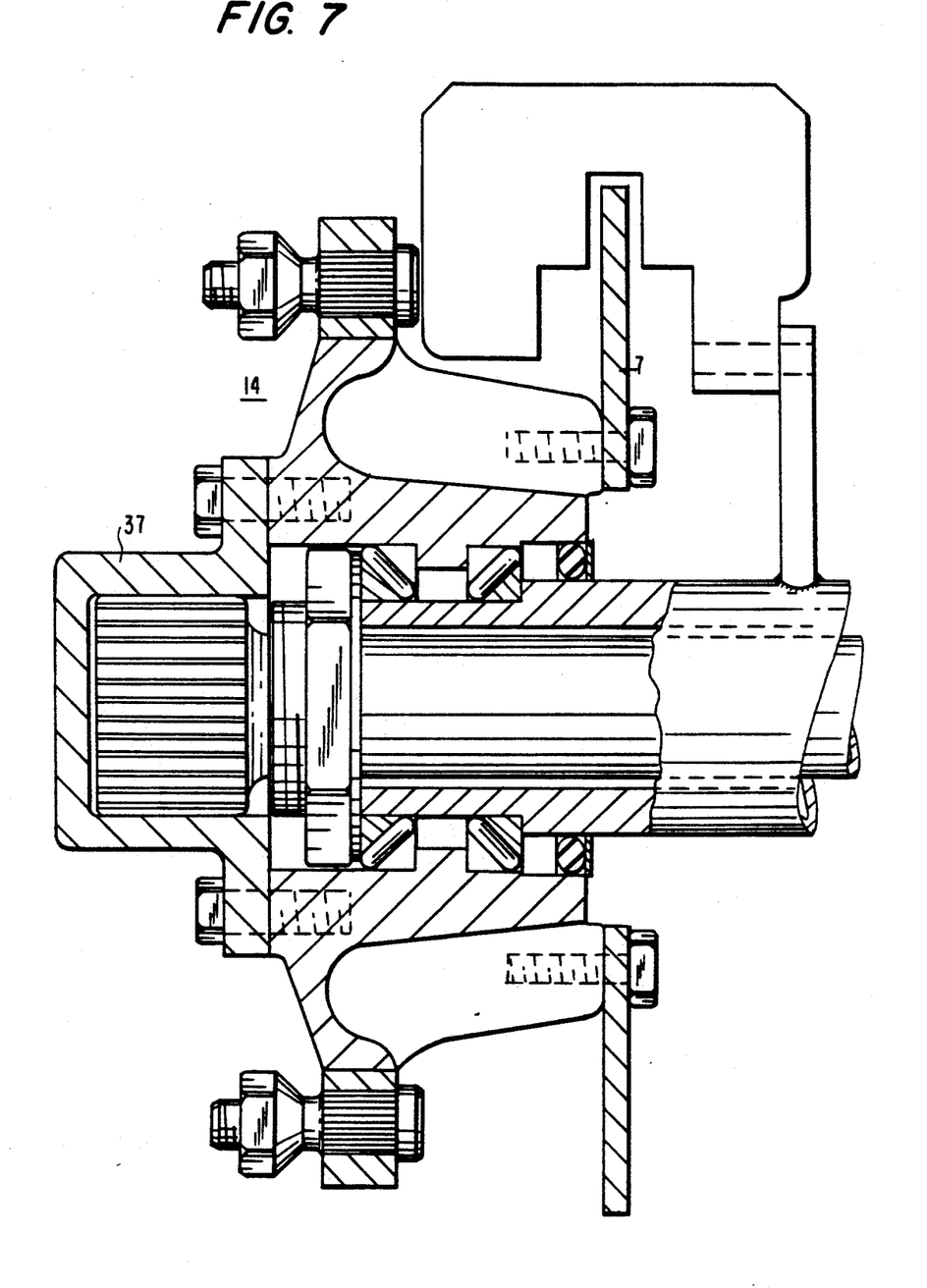
FIG. 7 is a cross-sectional view, on an enlarged scale, of a fully assembled hub assembly of the embodiment of FIG. 1, viewed from the rear of the car.

FIGS. 6 and 7 are cross-sectional views of a fully assembled hub assembly of the invention. In FIG. 6, the hub assembly is viewed from the front of the car and in FIG. 7, the hub assembly is viewed from the rear of the car.

Figure 3:
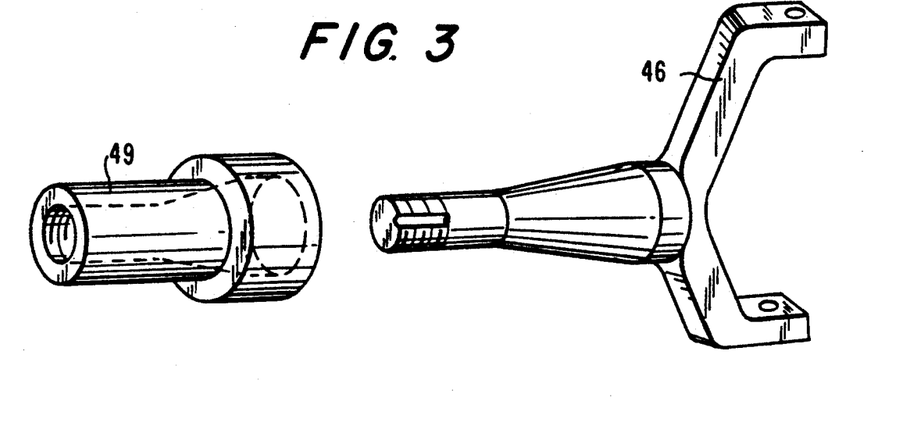
FIG. 3 is an exploded perspective view of a known front steering spindle and an adapter which enables it to interchange the hub from the front axle to the rear axle.

A Ford front spindle 46 may be coaxially coupled to the other components and a rubber seal 47 is pressed against the first end 16 of the wheel hub 14, as shown in FIG. 1, to rotate the wheel via said wheel hub. A rear axle housing 48 may be coaxially coupled to the other components via the rubber seal 47, as shown in FIGS. 2 and 3, whereby the wheel is rotated freely via its wheel hub 14 around the Ford spindle 46 (FIGS. 2 and 3). A Baby Grand to Ford Pinto adapter 49 (FIG. 3) may be used to couple the Ford spindle 46 coaxially to the other components (FIG. 3) to enable the wheel to rotate about said spindle.

Figure 4:
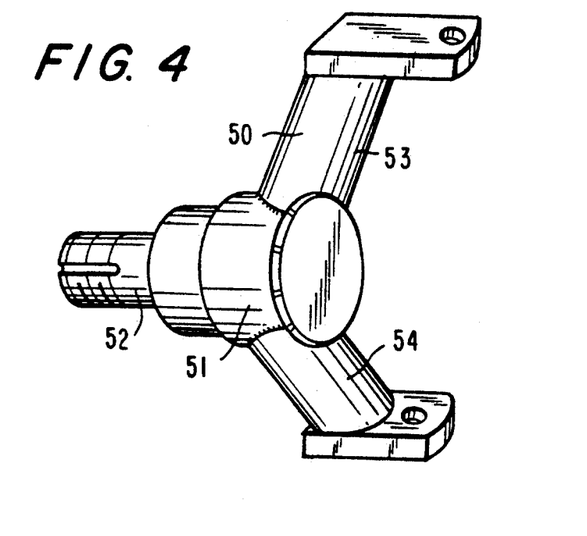
FIG. 4 is a perspective view of an embodiment of a front tubular spindle of the invention which is used without an adapter.

A tubular front spindle 50 (FIG. 4) may be coaxially coupled to the other components, in place of the spindle 46 in FIG. 1 to permit the wheel to rotate about said spindle. the front spindle 50 has a hollow hub 51. An externally threaded connector 52 extends coaxially from the hub 51 and opens thereinto. A pair of oppositely extending radial drive arms 53 and 54 extend from the hub 51. Each of the arms 53 and 54 opens into the hub 51 and consists of a tube.

Each wheel hub 14 has a plurality of studs 55 to 59, of which all except 59 are shown in FIGS. 1 and 2, extending from the ears 18 to 22, respectively, for affixing said wheel hub to its corresponding wheel.

Although the invention has been shown and described in what is believed to be the most practical and preferred embodiment, it is apparent that departures from the specific method and designs described and shown will suggest themselves to those skilled in the art and may be made without departing form the spirit and scope of the invention. I, therefore, do not wish to restrict myself to the particular construction described and illustrated, but desire to avail myself of all modifications that may fall within the scope of the appended claims.

I claim:

1. In an automotive vehicle having a front axle having spaced opposite first and second ends, a rear axle having spaced opposite first and second ends, a plurality of brake rotors, each in proximity with a corresponding one of the ends of said axles in coaxial relation with its corresponding axle, a universal wheel hub removably affixed to a brake rotor in coaxial relation with its axle, said wheel hub comprising a hollow substantially cylindrical base portion coaxially positioned around said axle on the side of said brake rotor closer to the end of said axle than the opposite side of said brake rotor, said base portion having a first end and a spaced opposite second end axially farther from said brake rotor than said first end, a plurality of equiangularly spaced ears extending radially from said second end of said base portion of said hub for equal radial distances and a plurality of equiangularly spaced gussets equal in number to said ears extending radially from said base portion, each of said gussets extending from a corresponding one of said ears along said base portion to said first end of said base portion, each of said gussets having coupling means at its end adjacent said first end of said base portion to enable said rotor to be removably affixed to said wheel hub whereby said gussets reinforce said ears thereby maintaining the structural integrity of said wheel hub and the spaces between said ears and gussets permit the flow of cooling air over said wheel hub and to said brake rotor, and bearing means positioned between said axle and said wheel hub and in contact with both said wheel hub and said axle, and axle end locking means at an end of said axle for removably securing said wheel hub and bearing means to its axle at the end of said axle.

2. In an automotive vehicle as claimed in claim 1, wherein said base portion of said wheel hub has five equiangularly spaced ears and five equiangularly spaced gussets.

3. In an automotive vehicle as claimed in claim 1, wherein said vehicle is a modified mini stock racing car.

4. In an automotive vehicle as claimed in claim 2, wherein each of said gussets tapers down from its end at its corresponding ear to said first end of said base portion.

5. In an automotive vehicle as claimed in claim 4, wherein said locking means comprises a lock nut and wherein said vehicle further has a dust cap at said end of said axle for capping end thereby covering the lock nut.

6. An automotive vehicle, comprising a front axle, having spaced opposite first and second ends;

a rear axle having spaced opposite first and second ends;

a plurality of brake rotors, each in proximity with a corresponding one of the ends of said axles in coaxial relation with its corresponding axle;

a universal wheel hub removably affixed to a brake rotor in coaxial relation with its axle, said wheel hub having a hollow cylindrical base portion coaxially positioned around said axle on the side of said brake rotor closer to the end of said axle than the opposite side of said brake rotor, said base portion having a first end and a spaced opposite second end axially farther from said brake rotor than said first end, a plurality of equinangularly spaced ears extending radially from said second end of said base portion of said hub for equal radial distances and a plurality of equiangularly spaced gussets equal in number to said ears extending radially from said base portion, each of said gussets extending from a corresponding one of said ears along said base portion to said first end of said base portion, each of said gussets having coupling means at its end adjacent said first end of said base portion to enable said brake rotor to be removably affixed to said wheel hub whereby said gussets reinforce said ears thereby maintaining the structural integrity of said wheel hub and the spaces between said ears and gussets permit the flow of cooling air over said wheel hub and to said brake rotor;

bearing means positioned between said axle and hub and in contact with both said wheel axle; and a lock nut at an end of said axle for removably securing said wheel hub to its axle at the end of said axle.

7. An automotive vehicle as claimed in claim 6, wherein said base portion of said wheel hub has five equiangularly spaced ears and five equiangularly spaced gussets.

8. An automotive vehicle as claimed in claim 6, wherein said vehicle is a modified mini stock racing ear.

9. An automotive vehicle as claimed in claim 7, wherein each of said gussets tapers down from its end at its corresponding ear to said first end of said base portion.

10. An automotive vehicle as claimed in claim 9, further comprising a dust cap at said end of said axle for capping said end thereby covering the lock nut.

11. An automotive vehicle as claimed in claim 9, wherein said rear axle is a drive axle and further comprising a plurality of lock nuts, each at a corresponding end of a corresponding one of said axles, a pair of dust caps, each at a corresponding end of said front axle for capping the ends of said front axle thereby covering the corresponding lock nut and a pair of drive flanges, each at a corresponding end of said rear axle for capping the ends of said rear axle thereby covering the corresponding lock nut.

12. An automotive vehicle as claimed in claim 11, wherein each of said drive flanges has 24 splines and accommodates eight bolts.

13. An automotive vehicle as claimed in claim 7, further comprising a pair of front spindles each at a corresponding end of one of said axles, each of said front spindles having a hollow hub, an externally threaded connector extending coaxially from said hub and opening thereinto and a pair of oppositely extending radial drive arms extending from said hub, each opening into said hub and consisting of a tube.

14. A modified mini stock racing car, comprising a front axle having spaced opposite first and second ends;

a rear drive axle having spaced opposite first and second ends;

a plurality of brake rotors, each in proximity with a corresponding one of the ends of said axles in coaxial relation with its coresponding axle;

a universal wheel hub removably affixed to a brake rotor in coaxial relation with its axle, said wheel hub having a hollow cylindrical base portion coaxially positioned around said axle on the side of said brake rotor closer to the end of said axle than the opposite side of said brake rotor, said base portion having a first end and a spaced opposite second end axially farther from said brake rotor than said first end, five equiangularly spaced ears extending radially from said second end of said base portion of said hub for equal radial distances and five equiangularly spaced gussets extending radially from said base portion, each of said gussets extending from a corresponding one of said ears along said base portion to said first end of said base portion, each of said gussets tapering down from its end at its corresponding ear to said first end of said base portion and each of said gussets having coupling means at its end adjacent said first end of said base portion to enable said brake rotor to be removably affixed to said wheel hub whereby said gussets reinforce said ears thereby maintaining the structural integrity of said wheel hub and the spaces between said ears and gussets permit the flow of cooling air over said wheel hub and to said brake rotor;

bearing means positioned between said axle and said wheel hub and in contact with both said wheel hub and said axle; and a lock nut at an end of said axle for removably securing said wheel hub to its axle at the end of said axle.

15. A modified mini stock racing car as claimed in claim 14, further comprising a pair of dust caps, each at a corresponding end of said front axle for capping the ends of said front axle thereby covering the corresponding lock nut.

16. A modified mini stock racing car as claimed in claim 15, further comprising a pair of drive flanges each at a corresponding end of said rear axle for capping the ends of said rear axle thereby covering the corresponding lock nut.

17. A modified mini stock racing car as claimed in claim 16, wherein each of said drive flanges has 24 splines and accommodates eight bolts.

* * * * *